United States Patent
Cho et al.

(10) Patent No.: US 10,045,278 B2
(45) Date of Patent: Aug. 7, 2018

(54) ELECTRONIC DEVICE AND METHOD FOR SEARCHING FOR ACCESS POINT IN LOCAL AREA NETWORK AT ELECTRONIC DEVICE

(71) Applicant: Samsung Electronics Co., Ltd., Gyeonggi-do (KR)

(72) Inventors: Sung-Rae Cho, Gyeonggi-do (KR); Tae-Yoon Kim, Gyeonggi-do (KR); Chae-Man Lim, Seoul (KR); Jung-Woo Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/324,976

(22) PCT Filed: Jul. 9, 2014

(86) PCT No.: PCT/KR2014/006175
§ 371 (c)(1),
(2) Date: Jan. 9, 2017

(87) PCT Pub. No.: WO2016/006735
PCT Pub. Date: Jan. 14, 2016

(65) Prior Publication Data
US 2017/0223607 A1     Aug. 3, 2017

(51) Int. Cl.
*H04W 48/04*     (2009.01)
*H04W 48/16*     (2009.01)
(Continued)

(52) U.S. Cl.
CPC .......... *H04W 48/04* (2013.01); *H04B 17/318* (2015.01); *H04W 4/027* (2013.01);
(Continued)

(58) Field of Classification Search
CPC . H04W 36/32; H04W 36/0083; H04W 36/14; H04W 36/30; H04W 36/08;
(Continued)

(56) References Cited

U.S. PATENT DOCUMENTS

| | | |
|---|---|---|
| 7,096,030 B2 | 8/2006 | Huomo |
| 8,185,129 B2 | 5/2012 | Alizadeh-Shabdiz |

(Continued)

FOREIGN PATENT DOCUMENTS

| | | |
|---|---|---|
| KR | 1020110139960 | 12/2011 |
| KR | 1020120070177 | 6/2012 |

(Continued)

OTHER PUBLICATIONS

PCT/ISA/210 Search Report issued on PCT/KR2014/006175 (pp. 3).
PCT/ISA/237 Written Opinion issued on PCT/KR2014/006175 (pp. 4).

*Primary Examiner* — Kwasi Karikari
(74) *Attorney, Agent, or Firm* — The Farrell Law Firm, P.C.

(57) ABSTRACT

A method for searching for an access point in a local area network at an electronic device, in accordance with various embodiments, comprises: an operation for determining the moving level of the electronic device; and an operation for deciding, in accordance with the determination result of the moving level of the electronic device, whether or not an access point in the local area network is searched for. Other embodiments are possible.

18 Claims, 5 Drawing Sheets

(51) Int. Cl.
    *H04W 48/20*     (2009.01)
    *H04B 17/318*     (2015.01)
    *H04W 4/02*     (2018.01)
    *H04W 84/12*     (2009.01)

(52) U.S. Cl.
    CPC ........... *H04W 48/16* (2013.01); *H04W 48/20* (2013.01); *H04W 84/12* (2013.01)

(58) Field of Classification Search
    CPC .............. H04W 64/006; H04W 24/02; H04W 36/0061; H04W 84/12; H04W 24/10; H04W 36/0094; H04W 36/36; H04W 36/0088; H04W 36/04
    See application file for complete search history.

(56) References Cited

U.S. PATENT DOCUMENTS

| | | | |
|---|---|---|---|
| 8,401,570 B2 | 3/2013 | Wigren et al. | |
| 2009/0161626 A1* | 6/2009 | Crawford | H04W 36/14 370/331 |
| 2015/0141020 A1* | 5/2015 | Bengtsson | H04W 48/20 455/440 |

FOREIGN PATENT DOCUMENTS

| | | |
|---|---|---|
| KR | 1020130063756 | 6/2013 |
| KR | 1020140015823 | 2/2014 |

* cited by examiner

FIG.5

ELECTRONIC DEVICE AND METHOD FOR SEARCHING FOR ACCESS POINT IN LOCAL AREA NETWORK AT ELECTRONIC DEVICE

PRIORITY

This application is a National Phase Entry of PCT International Application No. PCT/KR2014/006175, which was filed on Jul. 9, 2014, the contents of which are incorporated herein by reference.

TECHNICAL FIELD

Various embodiments of the present invention relate to an electronic device, and further relate to a method of searching for an access point of a local area network in the electronic device.

BACKGROUND ART

In the next-generation mobile communication network, the introduction of an additional low power node is being considered, or traffic offloading to another RAT (radio access technology) (for example, a WiFi access point that is a local area network) is being considered because the number of users who use a mobile communication network is increasing and a higher transmission rate is required. In addition, in the latest 3GPP standard, the standardization of MAPCON, IFOM, or SaMOG is in progress, which can distribute traffic by using both the mobile communication network and WiFi, as well as the WiFi offloading.

In the case in which the electronic device uses one or more RATs (for example, WiFi), in order to minimize power consumption, the electronic device is required to efficiently search for an optimal nearby access point while the electronic device uses the mobile communication network. Although next-generation WiFi standard technologies have been actively proposed in the WiFi standard, such as 802.11k/r for performing the traffic loading balancing between access points or 802.11u for determining and notifying of the load occupation rate in the access point in advance, it is impossible to properly determine the load status, such as the congestion status in WiFi, with the current WiFi technology. As a result, optimized traffic offloading cannot be achieved.

As a temporary solution before the optimized traffic offloading is completed and implemented, many providers and electronic device manufacturers currently optimize a call manager at the access point end in the electronic device as much as possible to then efficiently select the available access point.

In the future, it is predicted that the WiFi access point will evolve to recognize a nearby interference channel or the activities of related users by using more intelligent functions and to estimate the traffic load of the access point in order to thereby enable the electronic device to connect to the optimal available access point.

DETAILED DESCRIPTION OF THE INVENTION

Technical Problem

With regard to the conventional technology for selecting an available access point by using a call manager, when there are many access points around, since the access point is discovered and/or determined empirically and/or reactionally, multiple searches of the available access point and connection failures thereof may occur, which may cause unnecessary power consumption. In addition, even in the case in which there is no available access point adjacent to the electronic device, a useless search for the available access point is periodically executed, thereby consuming the electric power.

In addition, if the problem related to the effective search of the available access point is resolved in the standard, the standard should be applied to every single WiFi access point and electronic device, but realistically, it may be difficult to apply the standard to all the cheap WiFi access points that are distributed randomly.

Therefore, various embodiments of the present invention provide an electronic device and a searching method of an access point of a local area network in the electronic device in order to propose a white list management technique of available access points in which a local area communication module (for example, a WiFi module) in the electronic device is dynamically activated or deactivated and the electronic device can effectively search for the optimal nearby WiFi access point that is accessible when the local area communication module is activated.

In addition, various embodiments of the present invention provide an electronic device and a searching method of an access point of a local area network in the electronic device in which the electronic device searches for the WiFi access point only when it is necessary in order to thereby prevent an unnecessary search of the WiFi access point so that the power consumption of the electronic device can be minimized.

Technical Solution

According to one aspect of the present invention, a method of searching for an access point of a local area network in an electronic device may include: determining the moving level of the electronic device; and determining whether or not to search for an access point of the local area network according to a result of the determination on the moving level of the electronic device.

According to another aspect of the present invention, an electronic device may include: a local area communication module that searches for one or more access points of a local area network and performs wireless local area communication; and a controller that determines the moving level of the electronic device and determines whether or not to search for the access point of the local area network according to a result of the determination on the moving level

Advantageous Effects

According to the electronic device and the method of searching for an access point of a local area network in the electronic device in accordance with the various embodiments, it is possible to prevent an unnecessary search for the access point in the local area network, thereby minimizing the power consumption of the electronic device.

MODE FOR CARRYING OUT THE INVENTION

Hereinafter, various embodiments of the present invention will be described with reference to the accompanying drawings. The present invention may be modified in various forms and include various embodiments, but specific examples are illustrated in the drawings and described in the description. However, the description is not intended to limit the present invention to the specific embodiments, and it shall be appreciated that all the changes, equivalents and substitutions belonging to the idea and technical scope of the present invention are included in the present invention. In connection with descriptions of the drawings, like reference numerals designate like elements.

The term "include" or "may include" refers to the existence of a corresponding disclosed function, operation or component which can be used in various embodiments of the present invention and does not limit one or more additional functions, operations, or components. In the present invention, the terms such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In various embodiments of the present invention, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present invention may modify various components of various embodiments but does not limit the corresponding components. For example, the above expressions do not limit the sequence and/or importance of the elements. The above-described expressions may be used to distinguish an element from another element. For example, a first user device and a second user device indicate different user devices although both of them are user devices. For example, without departing from the scope of the present invention, a first component element may be named a second component element. Similarly, the second component element also may be named the first component element.

It should be noted that if it is described that one component element is "coupled" or "connected" to another component element, the first component element may be directly coupled or connected to the second component, and a third component element may be "coupled" or "connected" between the first and second component elements. Conversely, when one component element is "directly coupled" or "directly connected" to another component element, it may be construed that a third component element does not exist between the first component element and the second component element.

The terms in various embodiments of the present invention are used to describe a specific embodiment, and are not intended to limit the present invention. As used herein, the singular forms are intended to include the plural forms as well, unless the context clearly indicates otherwise.

Unless defined differently, all terms used herein, which include technical terminologies or scientific terminologies, have the same meaning as that understood by a person skilled in the art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present invention.

An electronic device according to various embodiments of the present invention may be a device with a communication function. For example, the electronic device may include at least one of a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, a wearable device (e.g., a head-mounted-device (HMD) such as electronic glasses, electronic clothes, an electronic bracelet, an electronic necklace, an electronic appcessory, an electronic tattoo, or a smart watch).

According to some embodiments, the electronic device may be a smart home appliance with a communication function. The smart home appliances may include at least one of, for example, televisions, digital video disk (DVD) players, audio players, refrigerators, air conditioners, cleaners, ovens, microwaves, washing machines, air purifiers, set-top boxes, TV boxes (e.g., HomeSync™ of Samsung, Apple TV™, or Google TV™), game consoles, electronic dictionaries, electronic keys, camcorders, or electronic frames.

According to some embodiments, the electronic device may include at least one of various medical appliances (e.g. Magnetic Resonance Angiography (MRA), Magnetic Resonance Imaging (MRI), Computed Tomography (CT) machine, and an ultrasonic machine), navigation devices, Global Positioning System (GPS) receivers, Event Data Recorders (EDRs), Flight Data Recorders (FDRs), automotive infortainment devices, electronic equipments for ships (e.g. navigation equipments for ships, gyrocompasses, or the like), avionics, security devices, head units for vehicles, industrial or home robots, Automatic Teller Machines (ATM) of banking facilities, and Point Of Sales (POSs) of shops.

According to some embodiments, the electronic device may include at least one of furniture or a part of a building/structure, an electronic board, an electronic signature receiving device, a projector, and various types of measuring devices (for example, a water meter, an electric meter, a gas meter, a radio wave meter and the like) including a camera function. An electronic device according to various embodiments of the present invention may be a combination of one or more of above described various devices. Also, an electronic device according to various embodiments of the present invention may be a flexible device. Also, an electronic device according to various embodiments of the present invention is not limited to the above described devices.

The term "user" used in various embodiments may refer to a person who uses an electronic device or a device (for example, an artificial intelligence electronic device) that uses an electronic device.

Figure 1:
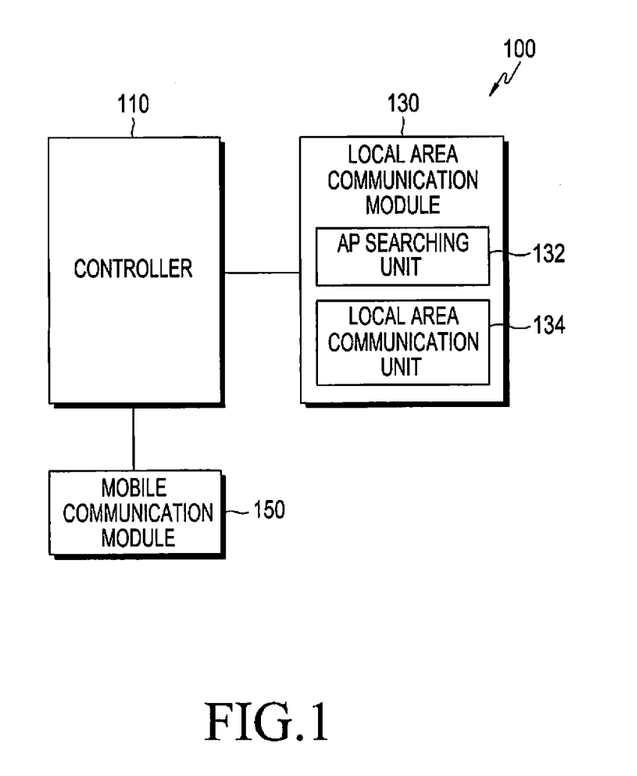
FIG. 1 is a block diagram of an electronic device, according to an embodiment of the present invention.

FIG. 1 is a block diagram of an electronic device, according to an embodiment of the present invention. Referring to FIG. 1, the electronic device 100 may include a controller 110, a local area communication module 130, and a mobile communication module 150. The local area communication module 130 may include an access point searching unit 132 (hereinafter, referred as an AP searching unit 132) and a local area communication unit 134.

The local area communication module 130 may access (connect to) an access point (AP) that provides a local area network to the electronic device 100 under the control of the controller 110, and the electronic device 100 may access, through the local area communication module 130, the Internet in the place where the access point is installed.

The AP searching unit 132 of the local area communication module 130 may search for one or more accessible access points in the local area network under the control of the controller 110. The local area communication unit 134 of the local area communication module 130 may access one of the access points that are discovered by the AP searching unit 132 in order to thereby perform the local area communication under the control of the controller 110.

The local area communication module 130, for example, may include a Bluetooth module (not shown), an infrared data association (IrDA) module (not shown), a WiFi-Direct (hereinafter, referred to as WiFi) communication module (not shown), an NFC (Near Field communication) module (not shown), a visible light communication module (not shown), or the like.

Under the control of the controller 110, the mobile communication module 150 may allow the electronic device 100 to access external devices through mobile communication to then receive signals from the external devices by using one or more antennas (not shown). The mobile communication module 150 may transmit/receive wireless signals for voice calls, video calls, a short message service (SMS), or a multimedia message service (MMS) to/from a mobile phone (not shown), a smart phone (not shown), a tablet PC (not shown), or another device (not shown), which has a phone number that is input into the electronic device 100.

The controller 110 may include a CPU (not shown), a ROM (not shown) that stores control programs for controlling the electronic device 100, and a RAM (not shown) that stores signals or data received from the outside of the electronic device 100 or is used as a memory area for operations that are performed in the electronic device 100. The CPU may include a single-core, a dual-core, a triple-core, or a quad-core. The CPU, ROM, and RAM may be connected with each other through an internal bus (not shown). The controller 110 may be implemented in an application processor (AP) or in a communication processor (CP). The controller 110 may be implemented in the communication processor for low-power operation in the idle mode.

The controller 110 may control the local area communication module 130 and the mobile communication module 150.

According to an embodiment of the present invention, the controller 110 may determine the moving level of the electronic device 100, and may determine whether or not to search for the access point by the AP searching unit 132 according to the determination of the moving level.

The operation of determining the moving level of the electronic device 100 by the controller 110 as described above, according to the embodiment of the present invention, may determine the moving level of the electronic device 100 by using a signal that is received through the mobile communication module 150. For example, the controller 110 may identify a change in the Doppler frequency of a serving cell of the electronic device 100, and may identify the moving level of the electronic device 100 by using the identified Doppler frequency change in the serving cell. In addition, for example, the controller 110 may identify a change in the strength of a signal that is received from one or more nearby cells of the electronic device 100, and may identify the moving level of the electronic device 100 by using the identified strength change of the signal received from the nearby cell. In addition, for example, the controller 110 may identify a change in the strength of a signal that is received from a base station of the mobile communication network at a predetermined time, and may identify the moving level of the electronic device 100 by using the identified strength change of the signal received from the base station. In addition, for example, the controller 110 may identify a change in the number of nearby cells of the electronic device 100, and may identify the moving level of the electronic device 100 by using the identified change in the number of nearby cells. According to the embodiment, if n is changed depending on the position of the electronic device 100 when there are n nearby cells, the terminal may be determined to move in order to thereby identify the moving level of the electronic device 100.

In addition, according to the embodiment of the present invention, the electronic device 100 may include a GPS module (not shown) and/or a sensor (not shown) for sensing the position of the electronic device 100, an acceleration sensor (not shown) for measuring the acceleration of the electronic device, or the like, and the controller 110 may identify the moving level of the electronic device 100 by using the position of the electronic device 100 sensed through the GPS module and/or the sensor for sensing the position. In addition, the controller 110 may identify the moving level of the electronic device 100 by using a measured value of the acceleration sensor or the like.

The GPS module may receive radio waves from a plurality of GPS satellites (not shown) in the Earth's orbit, and may calculate the position of the electronic device 100 by using a time of arrival from the GPS satellite (not shown) to the electronic device 100.

Furthermore, the sensor for sensing the position of the electronic device 100 described above, for example, may include a geo-magnetic sensor (not shown) and/or a gyro sensor (not shown). The geomagnetic sensor may detect, by using the Earth's magnetic field, a point of the compass, such as east, west, south, or north, to which the electronic device 100 is directed, and the gyro sensor may calculate a value of an angle at which an object rotates for a unit time based on one axis.

In the operation of determining whether or not to search for an access point by the AP searching unit 132, according to the embodiment of the present invention, the controller 110 may: control the AP searching unit 132 to search for one or more accessible access points; when an access point is discovered, may identify a signal strength change of the discovered access point; control the electronic device 100 to access, or to not access, the discovered access point through the local area communication unit 134 according to the moving level of the electronic device 100 and the identified signal strength change; identify a change in the moving level of the electronic device 100 while being connected to, or disconnected from, the discovered access point; and determine whether or not to search for the access point according to the change in the moving level of the electronic device 100.

The operation of determining the moving level of the electronic device 100 and the operation of determining whether or not to search for the access point by the AP searching unit 132 under the control of the controller 110 will be described in more detail later.

Figure 2:
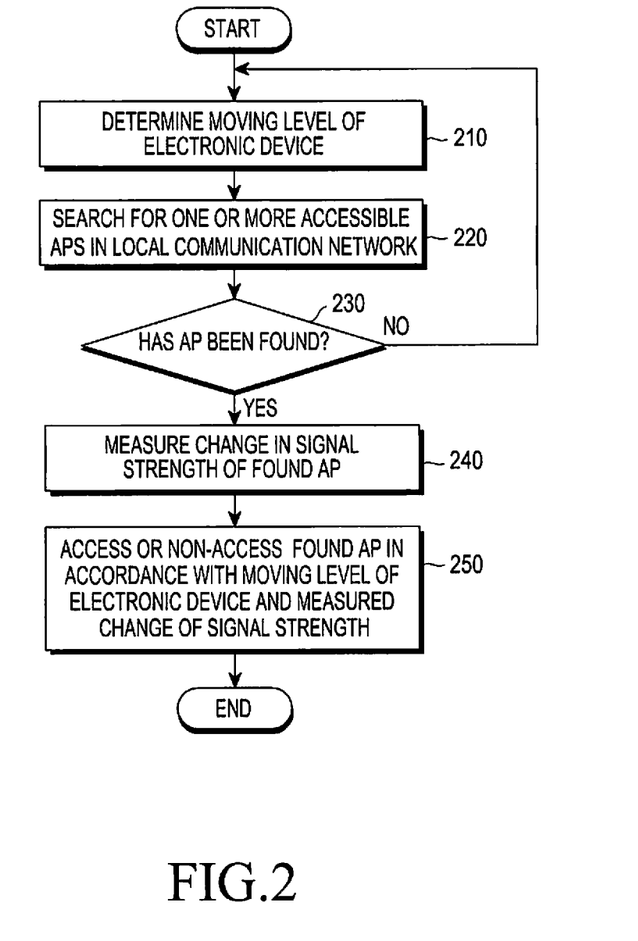
FIG. 2 is a flowchart of searching for an access point of the local area network in an electronic device, according to an embodiment of the present invention.

FIG. 2 is a flowchart of searching for an access point of the local area network in the electronic device, according to an embodiment of the present invention. Referring to FIG. 2, the electronic device may perform an operation of determining the moving level of the electronic device and an operation of determining whether or not to search for an access point of the local area network, according to a result of the determination on the moving level of the electronic device.

In operation 210, the electronic device may determine the moving level of the electronic device. For example, the electronic device may identify the moving level of the electronic device by using the position information of the electronic device, which is measured through a GPS module in the electronic device and/or a sensor of the electronic device for sensing the position and movement thereof, and/or a sensor for measuring the acceleration of the electronic device. In addition, for example, the electronic device may identify the moving level of the electronic device by using a change in the Doppler frequency, a change in the strength of a reception signal that is received from a serving cell of the electronic device or from a nearby cell thereof, a change in the number of nearby cells of the electronic device, or the like. In addition, if there are not sufficient nearby cells, this may be considered along with a change in the strength of a reception signal that is received from an access point of a nearby local area network.

In addition, the electronic device may compare the identified moving level with a specified reference value (hereinafter, referred to as a first reference value) to then determine the moving level of the electronic device. For example, if the identified moving level is equal to, or more than, the first reference value, the moving level of the electronic device may be determined to be high. In addition, if the identified moving level is less than the first reference value, the moving level of the electronic device may be determined to be low. The moving level may frequently vary around the reference value, so it is preferable to determine whether the moving level is high or low, only when the moving level remains to be equal to, or more than the reference value, or remains to be less than the reference value, for a constant period of time.

Meanwhile, the first reference value described above may be properly configured through a field test to represent a stationary state or a moving state, and may be configured to have an appropriate level that is input by the user.

In addition, the electronic device may identify a change in the moving level of the electronic device through the comparison with a determination result of a previous moving level. The change of the moving level may be identified through a change in the determination of the moving level to be high or low according to the operation described above. Accordingly, the change of the moving level may be divided into: the case where the moving level is changed from low to low; the case where the moving level is changed from low to high; the case where the moving level is changed from high to low; and the case where the moving level is changed from high to high. The change of the moving level from low to low may refer to the case where the electronic device hardly moves or moves very slightly. In addition, the change of the moving level from high to high may refer to a big change in the moving level of the electronic device.

In addition, the electronic device may determine whether or not to search for an access point of the local area network according to the change in the moving level of the electronic device. That is, the electronic device may adaptively control a search cycle of an accessible access point according to the change in the moving level of the electronic device.

The electronic device may search for one or more accessible access points (APs) of the local area network in operation 220.

For example, when the mean value of the amounts of changes in the strength of a reception signal that is received from the nearby cell of the electronic device is more or less than a specified reference value (for example, the first reference value), the electronic device may search for one or more accessible access points of the local area network. In addition, the access point, for example, may be a WiFi access point.

Furthermore, in the search of the access point, the electronic device may search for the access points in every channel, or in limited channels. In the present invention, the electronic device may search for one or more accessible access points of the local area network only when the change of the moving level (for example, the signal strength change) is detected in operation 210. In addition, the electronic device may search for the access points according to specified search conditions (for example, the number of searches, a search cycle, or the like).

Meanwhile, the operation in which the electronic device searches for one or more accessible access points of the local area network may use the following information that is periodically updated in order to determine available Wi-Fi access points.

For example, an access point of which the strength of the reception signal that is received by the electronic device is equal to, or more than, a specified reference value (ensuring a high reception signal strength), an access point of which the strength of the reception signal that is received by the electronic device is less than a specified reference value (ensuring a stable reception signal strength), and a change in the number of available access points by the access point of which the reception signal strength is equal to, or more than, a specified reference value and by the access point of which the reception signal strength is less than a specified reference value may be updated depending on the moving level (a positional change) of the electronic device and/or a change in the surrounding environment of the electronic device. Therefore, the electronic device may determine and search for one or more accessible access points by using the information that is periodically updated as described above.

In operation 230, the electronic device may determine whether or not one or more accessible access points have been discovered. If it is determined that an access point has been discovered in operation 230, the electronic device may proceed to operation 240. Otherwise, the electronic device may perform operation 210 again.

In operation 240, the electronic device may measure a change in the signal strengths of one or more access points that have been discovered.

In operation 250, the electronic device may, or may not, access the discovered access point according to the moving level of the electronic device and the measured reception signal strength and signal strength change.

According to the embodiment, in operation 250, the electronic device may determine an optimal available access point that has the minimum signal strength change among the discovered access points that have more reception signal strengths than a constant level according to the measured signal strength changes of the access points.

After searching for the access point having the minimum signal strength change, the electronic device may compare the signal strength change of the access point having the minimum signal strength change with a specified reference value (hereinafter, referred to as a second reference value) in order to thereby determine whether the signal strength change is high or low. For example, if the signal strength change of the access point having the minimum signal strength change is equal to, or more than, the second reference value, the signal strength change may be determined to be high. For example, if the signal strength change of the access point having the minimum signal strength change is less than the second reference value, the signal strength change may be determined to be low.

Meanwhile, the second reference value described above may be properly configured to represent a reference value of the signal strength change through a field test, or may be configured to have an appropriate level that is input by the user. In addition, the moving level may frequently vary around the reference value, so it is preferable to determine the degree of the signal strength change only when the moving level remains to be equal to, or more than, the reference value, or remains to be less than the reference value, for a constant period of time.

Thereafter, the electronic device may, or may not, access the access point having the minimum signal strength change according to the moving level of the electronic device and the signal strength change of the access point having the minimum signal strength change.

If the electronic device is determined to not move according to operation 210 above, and if no signal of an accessible access point is detected as a result of searching for accessible access points by the electronic device according to operations 220 and 230 described above, it is possible to inhibit the electronic device from periodically searching for the access point unless the electronic device moves. In addition, the electronic device may be inhibited from periodically searching for the access point unless an available access point is discovered in a car, bus, or train when the electronic device moves.

In addition, if the electronic device is determined to move and the moving level of the electronic device is high, and if there is an available access point that is accessible by the electronic device in transportation (for example, cars, buses, trains, or the like) by which the electronic device moves, the electronic device may enable to search for an access point at least once in order to search for an available access point in the transportation. However, if the moving level of the electronic device is high, and if there is no available access point that is accessible by the electronic device in the transportation (for example, cars, buses, trains, or the like) by which the electronic device moves (that is, when no signal of an access point is detected), the electronic device may be inhibited from further re-searching for the access point.

In addition, if an access point signal is detected even with an inappropriate offloading {for example, when the moving level of the electronic device is high and the signal strength change of the optimal discovered available access point (having the minimum signal strength change) is big}, the electronic device may enable to further search for an available access point.

Figure 3:
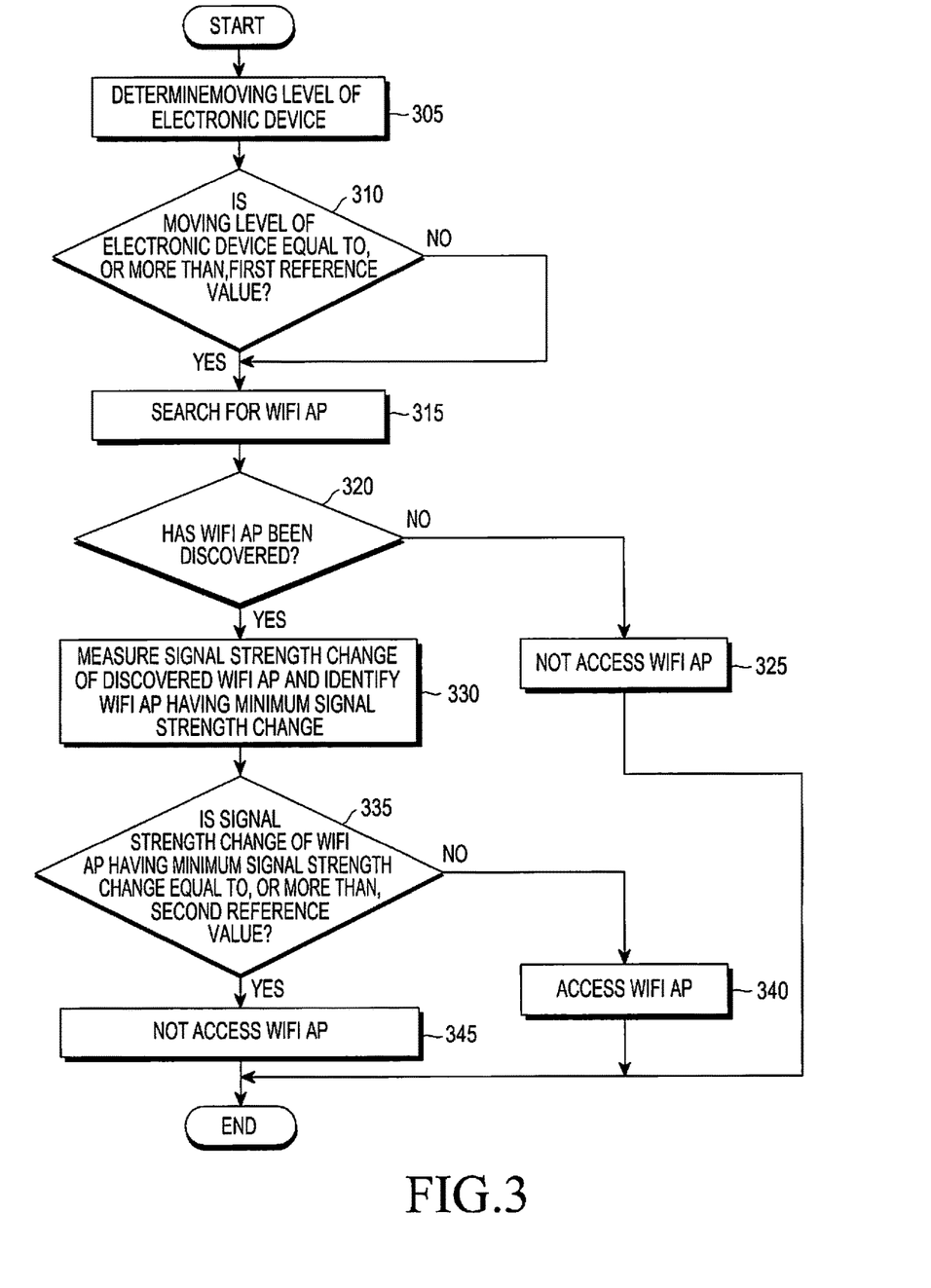
FIG. 3 is a flowchart of searching for an access point of the local area network in the electronic device, according to the embodiment of FIG. 2.

FIG. 3 is a flowchart of searching for an access point of the local area network in the electronic device, according to the embodiment of FIG. 2. Referring to FIG. 3, after determining the moving level of the electronic device through the mobile communication network, a search for a WiFi access point that is accessible by the electronic device may be performed by using information about the moving level (high or low) of the electronic device. The access to the WiFi access point may be determined based on a search result of a WiFi access point that is accessible by the electronic device and based on the movement information.

Referring to FIG. 3, an operation in which the electronic device searches for an access point of the local area network will be described by way of an operation of searching for a WiFi access point. In addition, the determination on the moving level of the electronic device will be described, for example, by way of the determination on the moving level of the electronic device by using signals that are received from nearby cells through the mobile communication network.

Referring to FIG. 3, in operation 305, the electronic device may identify the moving level of the electronic device.

According to an embodiment, with the help of Equation 1 below, the moving level of the electronic device may be identified by using reception signals of nearby cells through the mobile communication network.

$$\eta_{cell} = E\left[\frac{1}{n} \sum_{i=1}^{n} (r_t(i) - r_{t-1}(i))^2\right] \quad \text{[Equation 1]}$$

{$\eta_{cell}$ denotes the mean value of the amounts of changes in the strength of a reception signal from the nearby cell of the electronic device; $r_t(i)$ denotes the reception signal strength of the i-th cell at a time t; $r_{t-1}(i)$ denotes the reception signal strength of the i-th cell at a time t−1; E[x] denotes the mean value of x in a specified period of time (that is, for a search cycle); and n denotes the number of nearby cells of the electronic device}

Referring to Equation 1, the mean value of changes in the strength of a reception signal is calculated, which is received by the electronic device from a nearby cell in a specified period of time, and the moving level of the electronic device may be identified by using the calculated mean value. More specifically, a change in the reception strength change of the electronic device is measured from the time t−1 to the time t, and the mean value of the amounts of changes in the reception strength of the electronic device is calculated by using a mean value of absolute values of the amount of signal strength changes, an RMS (Root Mean Square) value, or an MS (Mean square) value in order to thereby identify the moving level of the electronic device.

Meanwhile, a dB value may be used in order to effectively configure a reference value, which will be described later. In addition, in order to recognize the movement of the electronic device more accurately, the number (n) of nearby cells of the electronic device may be preferably equal to, or more than, two. Substantially, in the case of a weak signal of the serving cell in the mobile communication network, the signal strengths of one or more nearby cells may be obtained. According to this, the number (n) of nearby cells of the electronic device may be determined by considering the case in which the signal strength from a base station is equal to, or more than, a certain reference value. In addition, if the electronic device is indoors, or if it fails to obtain a sufficient signal strength of a nearby cell (n<3; when the number of nearby cells is less than a specified number), the moving level of the electronic device may be determined in consideration of a reception signal strength change from an access point of a nearby local area network. For example, if it fails to obtain the reception signal strength information of a nearby cell other than the serving cell, a Wi-Fi access point search may be executed in order to thereby obtain the reception signal strength change of a nearby access point. The moving level of the electronic device may be determined by using the reception signal strength change from the cell including the reception signal strength change from the access point.

In operation 310, the electronic device may determine whether or not the moving level of the electronic device, which has been identified in operation 305, is equal to, or more than, the first reference value. If the moving level of the electronic device is determined to be equal to, or more than, the first reference value, or is determined to be less than the first reference value in operation 310, the electronic device may perform operation 315. If the moving level of the electronic device continues to be low or high compared to the previous result of the moving level, the electronic device may not perform operation 315. For example, if the current moving level is determined to be more than the first reference value after the previous moving level is determined to be less than the first reference value, the electronic device may perform operation 315. In addition, if the current moving level is determined to be less than the first reference value after the previous moving level is determined to be more than the first reference value, the electronic device may perform operation 315.

As the mean value of the amounts of changes in the reception signal strength from the nearby cell of the electronic device, which is calculated by Equation 1, reaches zero, it means that the electronic device hardly moves (the moving level is low), and as the mean value of the amounts of changes in the reception signal strength from the nearby cell of the electronic device increases, it means that the electronic device has moved a lot (the moving level is high).

For example, if the mean value of the amounts of changes in the reception signal strength from the nearby cell of the electronic device, which is calculated by Equation 1, is more than the first specified reference value as a result of comparing the mean value of the amounts of changes in the reception signal strength from the nearby cell of the electronic device with the first reference value, the moving level of the electronic device may be determined to be high, whereas if the mean value of the amounts of changes in the reception signal strength from the nearby cell of the electronic device is less than the first reference value, the moving level of the electronic device may be determined to be low.

It is preferable to configure a measurement cycle of the reception signal strength in inverse proportion to the moving speed of a terminal when measuring the reception signal strength change from the cell. When the time interval of the reception signal strength measurement is big, although the amount of change in the reception signal strength cannot be measured because the nearby cells are frequently changed, the change of the nearby cells is determined to mean that the mobility is high.

In operation 315, the electronic device may search for one or more accessible WiFi access points (APs).

In operation 320, the electronic device may determine whether or not an accessible WiFi access point has been discovered according to operation 315. If an accessible WiFi access point has been discovered in operation 320, the electronic device may perform operation 330. Otherwise, the electronic device may perform operation 325.

In operation 325, the electronic device may not access the WiFi access point.

In operation 330, the electronic device may measure the signal strength change of the discovered WiFi access point, and may identify a WiFi access point having the minimum signal strength change.

For example, when there are m nearby access points, Equation 2 may be used in order to search for an access point having the minimum signal strength change (that is, the optimal available access point).

$$\eta_{WiFi} = E\left[\min_{i=1 \to m} (k_t(i) - k_{t-1}(i))^2\right] \quad \text{[Equation 2]}$$

($\eta_{WiFi}$ win denotes the minimum mean square value of the amounts of changes in the reception signal strength; $k_t(i)$ denotes the mean reception signal strength from the i-th access point at a time t; $k_{t-1}(i)$ denotes the mean reception signal strength from the i-th access point at a time t−1; and E[x] denotes the mean value of x)

Referring to Equation 2, the optimal available access point having the minimum signal strength change may be identified.

The electronic device may determine whether or not the signal strength change of the Wi-Fi access point having the minimum signal strength change is equal to, or more than, the second reference value in operation 335. If the signal strength change of the Wi-Fi access point having the minimum signal strength change is equal to, or more than, the second reference value in operation 335, the electronic device may perform operation 345, whereas if the signal strength change of the Wi-Fi access point having the minimum signal strength change is less than the second reference value in operation 335, the electronic device may perform operation 340.

Meanwhile, for example, if the signal strength change of the access point having the minimum signal strength change is equal to, or more than, the second reference value, the signal strength change may be determined to be high. For example, if the signal strength change of the access point having the minimum signal strength change is less than the second reference value, the signal strength change may be determined to be low.

The electronic device may access the WiFi access point in operation 340.

The electronic device may not access the WiFi access point in operation 345.

According to the description above, access or non-access with respect to the access point may be determined according to the moving level of the electronic device and a search result of the access point, as follows.

If the moving level of the electronic device is determined to be high or low, and if the signal strength change of the access point having the minimum signal strength change is determined to be low, the electronic device may access the access point having the minimum signal strength change. In addition, if the moving level of the electronic device is determined to be high, and if the signal strength change of the access point having the minimum signal strength change is determined to be high, the electronic device may not access any access point. Furthermore, if the moving level of the electronic device is determined to be low, and if the signal strength change of the access point having the minimum signal strength change is determined to be high, the electronic device may not access the access point having the minimum signal strength change, and may re-search for one or more accessible access points of the electronic device according to specified conditions. The specified conditions, for example, may include information on the number of times of re-searching for access points and/or information on a cycle in which access points are re-searched for.

In addition, according to the description above, access or non-access to the access point depending on the moving level of the electronic device and the discovery result of the access point will be shown in Table 1.

TABLE 1

|  |  | Moving level of electronic device | |
|---|---|---|---|
|  |  | High → Low | Low → High |
| Search result of AP | Not given | Non-access to AP | Non-access to AP |
|  | Given (Signal strength change_Low) | Access to AP | Access to AP |
|  | Given (Signal strength change_High) | Non-access to AP Research of AP | Non-access to AP |

Referring to Table 1, if the moving level of the electronic device is determined to be from low to high, or to be from high to low, and if the signal strength change of the access point having the minimum signal strength change is determined to be low, the electronic device may access the access point having the minimum signal strength change. In addition, if the moving level of the electronic device is determined to be from low to high, and if the signal strength change of the access point having the minimum signal strength change is determined to be high, the electronic device may not access any access point. Furthermore, if the moving level of the electronic device is determined to be from high to low, and if the signal strength change of the access point having the minimum signal strength change is determined to be high, the electronic device may not access the access point having the minimum signal strength change, and may re-search for one or more accessible access points of the electronic device according to specified conditions. The specified conditions, for example, may include information on the number of times of re-searching for access points and/or information on a cycle in which access points are re-searched for.

For example, by using Equation 1 and Equation 2, a condition of determining the accessible and available access points and a condition of searching for accessible access points of the electronic device may be determined through the comparison with specified reference values (the first reference value and the second reference value), respectively.

If $\eta_{cell}$ is equal to, or more than, the first reference value and twin is equal to, or more than, the second reference value (referred to as a first condition), it may mean that the moving level of the electronic device is high and there is no available access point. Accordingly, it may be determined that the WiFi offloading or hand-over (HO) may be inappropriate. That is, it may be determined to not search for the access point.

If $\eta_{cell}$ is less than the first reference value and twin is equal to, or more than, the second reference value (referred to as a second condition), it may mean that the moving level of the electronic device is low and there may be available access points. Accordingly, it may be determined that a search of the access point is necessary so that the access point is to be discovered according to specified conditions (the number of searches and a search cycle).

If $\eta_{cell}$ is equal to, or more than, the first reference value and twin is less than the second reference value (referred to as a third condition), it may mean that the moving level of the electronic device is high and there may be available access points in transportation (for example, cars, buses, trains, or the like) by which the electronic device moves. Accordingly, it may be determined to activate a search of the access point.

If $\eta_{cell}$ is less than the first reference value and twin is less than the second reference value (referred to as a fourth condition), it may mean that the moving level of the electronic device is low and there may be available access points. Accordingly, it may be determined that a search of the access point is to be activated and then the WiFi offloading or hand-over is appropriate. That is, the access point may be determined to be discovered.

The first condition and the second condition may allow the electronic device to not access the access point, and the third condition and the fourth condition may allow the electronic device to access the access point.

The determination on a search of access points of the local area network depending on changes in the current and previous moving levels of the electronic device will be described with reference to Table 2.

TABLE 2

|  |  | Access to AP | Non-access to AP |
|---|---|---|---|
| Change of moving level of electronic device | Low → Low | Not search for AP | Not search for AP when there is no accessible AP Search for AP at least once when there is accessible AP |
|  | Low → High | Not search for AP (Option: search for AP at least once) | Search for AP at least once |
|  | High → Low | Not search for AP (Option: search for AP at least once) | Search for AP at least once |
|  | high → High | Not search for AP | Not search for AP |

Referring to Table 2, when a change in the moving level of the electronic device is identified while the electronic device is connected to the access point, it may be determined to not search for access points of the local area network. The moving level may be identified through the operation described above, and the change of the moving level, for example, may be divided into: the case where the moving level is changed from low to low (low→low); the case where the moving level is changed from low to high (low→high); the case where the moving level is changed from high to low (high→low); and the case where the moving level is changed from high to high (high→high).

In addition, when a change in the moving level of the electronic device from low to high or a change in the moving level of the electronic device from high to low is identified while the electronic device is connected to the access point, it may be determined to search for the access point of the local area network at least once according to specified conditions.

In addition, in a state in which no access point of the local area network is discovered, when a change in the moving level of the electronic device from low to low or a change in the moving level of the electronic device from high to high is identified, it may be determined to not search for the access point of the local area network.

In addition, (selectively,) when a change in the moving level of the electronic device from low to low is identified while the electronic device is not connected to the access point, it may be determined to search for the access point of the local area network at least once according to specified conditions.

Furthermore, when a change in the moving level of the electronic device from low to high is identified while the electronic device is not connected to the access point, it may be determined to search for the access point of the local area network at least once according to specified conditions.

FIG. 3 shows an example in which the electronic device executes an operation of re-searching for the access point based on the moving level information of the electronic device and a search result of accessible access points. When it is identified that the electronic device is not connected to the access point and the electronic device has not moved, the electronic device may be allowed to not search for the access point because a re-search of the accessible access point is not necessary. Additionally, when the movement of the electronic device is identified, the electronic device may be allowed to re-search for the accessible access point. However, when the electronic device remains in transportation (for example, cars, buses, trains, or the like) after the electronic device identifies that there is no accessible and available access point in the transportation, it is not necessary to execute a re-search of the accessible and available access point. Therefore, the electronic device may be allowed to not search for the access point. In addition, for example, even if the moving level is lowered in a predetermined period of time, the electronic device may not execute a search for the accessible and available access points.

Meanwhile, the search operation of the access points of the local area network described above may be repeatedly executed with the movement of the electronic device. For example, the operation of identifying the moving level of the electronic device may be periodically performed so that the moving level of the electronic device may be periodically updated. In addition, the electronic device may perform the search operation of the accessible access point at least once whenever the moving level of the electronic device is updated.

Meanwhile, additionally, Equation 2 may be used for determining the moving level of the electronic device. For example, when m of Equation 2 varies, it may be determined that the electronic device has moved.

Figure 4:
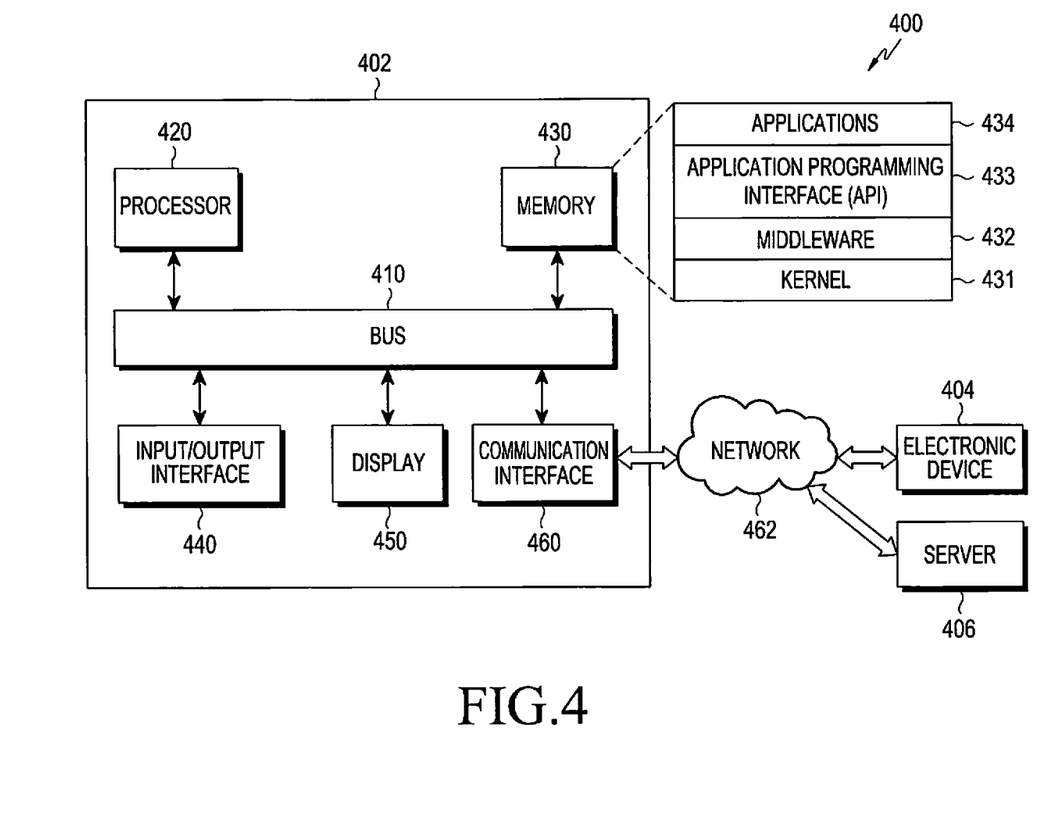
FIG. 4 is a view illustrating a network environment including an electronic device, according to various embodiments of the present invention.

FIG. 4 is a view illustrating a network environment 400 including an electronic device, according to various embodiments of the present invention.

Referring to FIG. 4, the electronic device 402 may include a bus 410, a processor 420, a memory 430, an input/output interface 440, a display 450, and a communication interface 460. The bus 410 may be a circuit that connects the elements of the electronic device 402 with each other and transfers communication data (for example, control messages) between the elements.

The processor 420, for example, may receive instructions from other elements (for example, the memory 430, the input/output interface 440, the display 450, the communication interface 460, or the like) through the bus 410 to then decode the received instructions, and may process a calculation or data according to the decoded instructions.

The memory 430 may store instructions or data that are received from, or created by, the processor 420 or other elements (for example, the input/output interface 440, the display 450, the communication interface 460, or the like). The memory 430, for example, may include programming modules, such as a kernel 431, middleware 432, an application programming interface (API) 433, or applications 434. Each programming module may be configured with software, firmware, hardware, or a combination thereof.

The kernel 431, for example, may control or manage system resources (for example, the bus 410, the processor 420, or the memory 430) that are used to execute the operations or functions that are implemented in other programming modules (for example, the middleware 432, the API 433, or the applications 434). In addition, the kernel 431 may provide an interface by which the middleware 432, the API 433, or the applications 434 may access each element of the electronic device 402 for control or management.

The middleware 432 may play the intermediate role between the API 433 or the applications 434 and the kernel 431 to communicate with each other for the transmission and reception of data. In addition, in relation to operation requests that are received from the applications 434, the middleware 432 may make a control (for example, scheduling or load-balancing) for the operation requests by using, for example, a method of giving priority for using system resources (for example, the bus 410, the processor 420, the memory 430, or the like) of the electronic device 402 to at least one of the applications 434.

The API 433 may be an interface by which the applications 434 control functions that are provided by the kernel 431 or the middleware 432, and, for example, may include one or more interfaces or functions (for example, instructions) for file control, window control, image processing, or text control.

According to various embodiments, the applications 434 may include an SMS/MMS application, an e-mail application, a calendar application, an alarm application, a health care application (for example, an application for measuring the amount of exercise or blood sugar), an environmental information application (for example, an application for providing atmospheric pressure, humidity, or temperature), or the like. Additionally or alternatively, the applications 434 may be an application that is related to the exchange of information between the electronic device 402 and external electronic devices (for example, an electronic device 404). The information-exchange-related application may include, for example, a notification relay application for relaying specific information to the external electronic device, or a device management application for managing the external electronic device.

For example, the notification relay application may include a function of transferring notification information that is created in other applications (for example, the SMS/MMS application, the e-mail application, the health care application, or the environmental information application) of the electronic device 402 to external electronic device (for example, the electronic device 404). Additionally or alternatively, the notification relay application, for example, may receive notification information from external electronic devices (for example, the electronic device 404) and may provide the same to a user. The device management application, for example, may manage (for example, install, delete, or update) at least some functions {for example, activating/deactivating an external electronic device (or some elements thereof), or adjusting the brightness (or resolution) of a display} of an external electronic device (for example, the electronic device 404) that communicates with the electronic device 402, applications executed in the external electronic device, or services (for example, a phone call service or a messaging service) provided by the external electronic device.

According to various embodiments, the applications 434 may include applications that are designated according to the attributes (for example, the type of electronic device) of an external electronic device (for example, the electronic device 404). For example, if the external electronic device is an MP3 player, the applications 434 may include an application that is related to the reproduction of music. Likewise, if the external electronic device is a mobile medical device, the applications 434 may include an application that is related to health care. According to an embodiment, the application 434 may include at least one of applications that are designated in the electronic device 402 or applications that are received from external electronic devices (for example, the server 406 or the electronic device 404).

The input/output interface 440 may transfer instructions or data that are input by the user through input/output devices (for example, sensors, keyboards, or touch screens) to the processor 420, the memory 430, or the communication interface 460 through, for example, the bus 410. For example, the input/output interface 440 may provide data on a user's touch that is input through a touch screen to the processor 420. The input/output interface 440, for example, may output, through input/output devices (for example, speakers or displays), instructions or data that are received from the processor 420, the memory 430, or the communication interface 460 through the bus 410.

The display 450 may display various pieces of information (for example, multimedia data or text data) to the user.

The communication interface 460 may perform communication between the electronic device 402 and external electronic devices (for example, the electronic device 404 or the server 406). For example, the communication interface 460 may be connected to a network 462 through wireless communication or wired communication in order to thereby communicate with the external electronic devices. The wireless communication, for example, may include at least one of Wi-Fi (wireless fidelity), Bluetooth (BT), near field communication (NFC), a global positioning system (GPS), or cellular communication (for example, LTE, LTE-A, CDMA, WCDMA, UMTS, WiBro, or GSM). The wired communication, for example, may include at least one of a universal serial bus (USB), a high definition multimedia interface (HDMI), recommended standard 232 (RS-232), or a plain old telephone service (POTS).

According to an embodiment, the network 462 may be telecommunication networks. The telecommunication networks may include at least one of a computer network, the Internet, the Internet of things, or a telephone network. According to an embodiment, a protocol (a transport layer protocol, a data link layer protocol, or a physical layer protocol) for communication between the electronic device 402 and external electronic devices may be supported by at least one of the applications 434, the API 433, the middleware 432, the kernel 431, or the communication interface 460.

Figure 5:
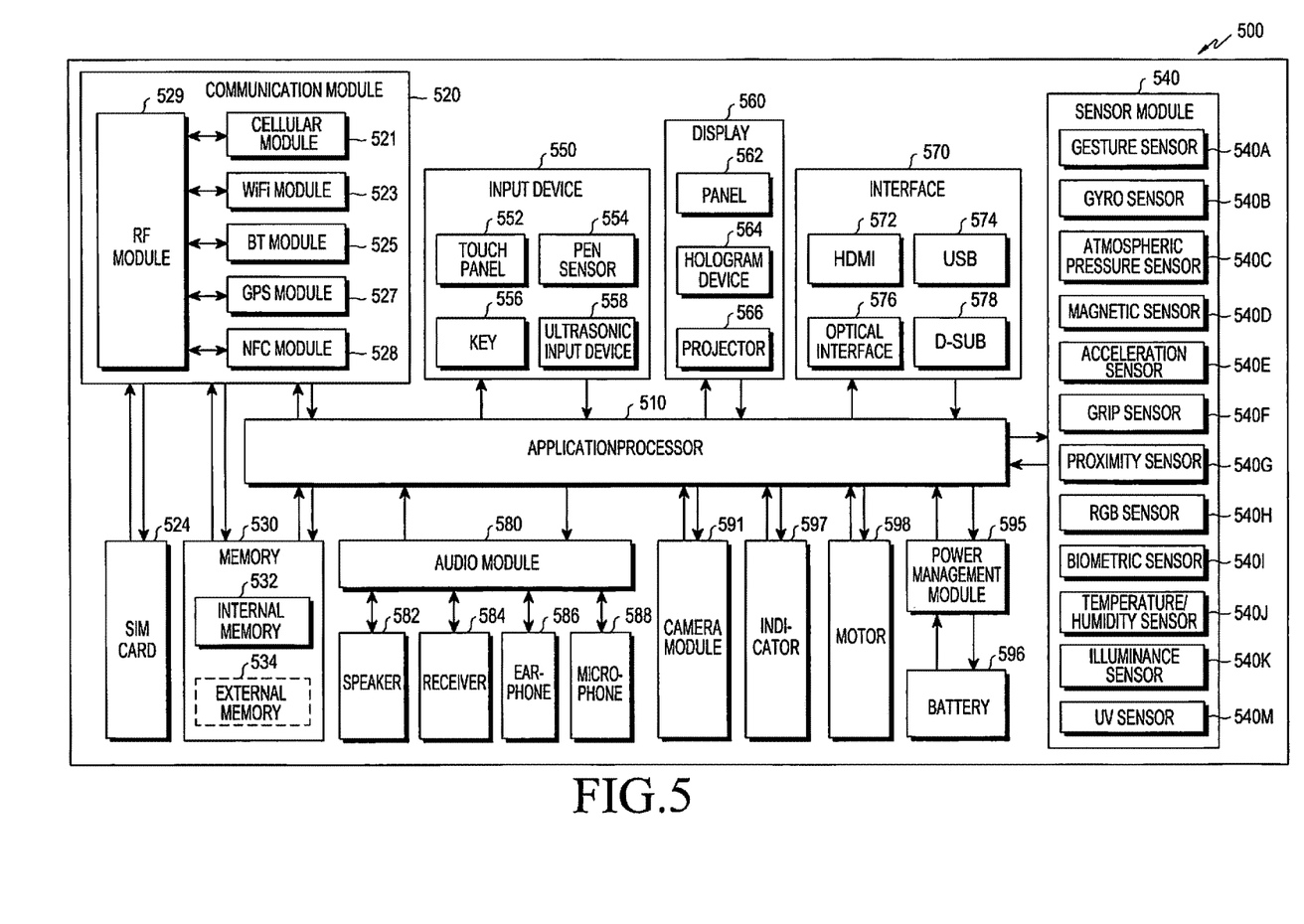
FIG. 5 is a block diagram of an electronic device, according to various embodiments of the present invention.

FIG. 5 is a block diagram 500 of an electronic device, according to various embodiments of the present invention. The electronic device 501, for example, may constitute all or some of the electronic device 501 shown in FIG. 5. Referring to FIG. 5, the electronic device 501 may include one or more processors {for example, application processors (AP)} 510, a communication module 520, a subscriber identification module (SIM) 524, a memory 530, a sensor module 540, an input device 550, a display 560, an interface 570, an audio module 580, a camera module 591, a power management module 595, a battery 596, an indicator 597, or a motor 598.

The AP 510 may control a multitude of hardware or software elements that are connected with the AP 510, and may perform the processing of various pieces of data and a calculation by executing an operating system or application programs. The AP 510 may be implemented by, for example, a system on chip (SoC). According to an embodiment, the AP 510 may further include a graphic processing unit (GPU).

The communication module 520 (for example, the communication interface 460) may perform the transmission and reception of data in the communication between the electronic device 501 (for example, the electronic device 501) and other electronic devices (for example, the electronic device 404 or the server 406) that are connected thereto through a network. According to an embodiment, the communication module 520 may include a cellular module 521, a WiFi module 523, a BT module 525, a GPS module 527, an NFC module 528, and a radio frequency (RF) module 529.

The cellular module 521 may provide services of voice calls, video calls, text messaging, or the Internet through communication networks (for example, LTE, LTE-A, CDMA, WCDMA, UMTS, WiBro, or GSM). In addition, the cellular module 521 may perform identification and verification of the electronic device in communication networks by using the subscriber identification module (for example, the SIM card 524). According to an embodiment, the cellular module 521 may perform at least some of the functions that are provided by the AP 510. For example, the cellular module 521 may perform at least some of the multimedia control function.

According to an embodiment, the cellular module 521 may include a communication processor (CP). In addition, the cellular module 521 may be implemented by, for example, a system on chip (SoC). Although the elements, such as the cellular module 521 (for example, the communication module), the memory 530, or the power management module 595, are illustrated to be separated from the AP 510, according to an embodiment, the AP 510 may be implemented to include at least some (for example, the cellular module 521) of the elements mentioned above.

According to an embodiment, the AP 510 or the cellular module 521 (for example, the communication module) may load instructions or data received from at least one of non-volatile memories or other elements that are connected thereto, respectively, to a volatile memory to then process the same. In addition, the AP 510 or the cellular module 521 may store data that is received from, or created by, at least one of other elements in a non-volatile memory.

Each of the WiFi module 523, the BT module 525, the GPS module 527, or the NFC module 528, for example, may include a processor for processing data that is transmitted and received through the corresponding module. Although the cellular module 521, the WiFi module 523, the BT module 525, the GPS module 527, or the NFC module 528 are illustrated in separated blocks in FIG. 5, according to an embodiment, at least some (for example, two or more) of the cellular module 521, the WiFi module 523, the BT module 525, the GPS module 527, or the NFC module 528 may be included in one integrated chip (IC) or one IC package. For example, at least some (for example, a communication processor corresponding to cellular module 521 and a WiFi processor corresponding to the WiFi module 523) of the processors corresponding to the cellular module 521, the WiFi module 523, the BT module 525, the GPS module 527, or the NFC module 528, respectively, may be implemented by a single SoC.

The RF module 529 may transmit and receive data (for example, RF signals). Although not shown, the RF module 529, for example, may include a transceiver, a power amp module (PAM), a frequency filter, a low noise amplifier (LNA), or the like. In addition, the RF module 529 may further include components, such as conductors or cables, for transmitting and receiving electromagnetic waves through free space in wireless communication. Although the cellular module 521, the WiFi module 523, the BT module 525, the GPS module 527 and the NFC module 528 share a single RF module 529 in FIG. 5, according to an embodiment of the present invention, at least one of the cellular module 521, the WiFi module 523, the BT module 525, the GPS module 527 and the NFC module 528 may transmit and receive RF signals through separated RF modules.

The SIM card 524 may be a card including a subscriber identification module, and may be inserted into a slot that is formed at a predetermined position of the electronic device. The SIM card 524 may include inherent identification information {for example, an integrated circuit card identifier (ICCID)} or subscriber information {for example, an international mobile sub scriber identity (IMSI)}.

The memory 530 (for example, the memory 430) may include an internal memory 532 or an external memory 534. The internal memory 532, for example, may include at least one of volatile memories {for example, a dynamic RAM (DRAM), a static RAM (SRAM), a synchronous dynamic RAM (SDRAM), or the like} or non-volatile memories {for example, an one time programmable ROM (OTPROM), a programmable ROM (PROM), an erasable and programmable ROM (EPROM), an electrically erasable and programmable ROM (EEPROM), a mask ROM, a flash ROM, a NAND flash memory, a NOR flash memory, or the like}.

According to an embodiment, the internal memory 532 may be a solid-state drive (SSD). The external memory 534 may further include a flash drive {for example, compact flash (CF), secure digital (SD), micro secure digital (Micro-SD), mini secure digital (Mini-SD), extreme digital (xD), a memory stick, or the like}. The external memory 534 may be functionally connected with the electronic device 501 through various interfaces. According to an embodiment, the electronic device 501 may further include a storage device (or a storage medium) such as a hard drive.

The sensor module 540 may measure physical quantities or may detect an operation state of the electronic device 501 to then convert the measured or detected information to electric signals. The sensor module 540, for example, may include at least one of a gesture sensor 540A, a gyro-sensor 540B, an atmospheric pressure sensor 540C, a magnetic sensor 540D, an acceleration sensor 540E, a grip sensor 540F, a proximity sensor 540G, a color sensor 540H {for example, a red-green-blue (RGB) sensor}, a biometric sensor 540I, a temperature/humidity sensor 540J, an illuminance sensor 540K, or an ultra violet (UV) sensor 540M. Alternatively or additionally, the sensor module 540, for example, may include an E-nose sensor (not shown), an electromyography sensor (EMG) (not shown), an electroencephalogram sensor (EEG) (not shown), an electrocardiogram sensor (ECG) (not shown), an infrared (IR) sensor (not shown), an iris sensor (not shown), a fingerprint sensor (not shown), or the like. The sensor module 540 may further include a control circuit for controlling one or more sensors that are included therein.

The input device 550 may include a touch panel 552, a (digital) pen sensor 554, keys 556, or an ultrasonic input device 558. The touch panel 552, for example, may recognize a touch input by at least one of a capacitive type, a pressure-sensitive type, an infrared type, or an ultrasonic type. In addition, the touch panel 552 may further include a control circuit. In the case of a capacitive type, a physical contact or access can be detected. The touch panel 552 may further include a tactile layer. In this case, the touch panel 552 may provide the user with a tactile reaction.

For example, the (digital) pen sensor 554 may be implemented by using a method that is the same as, or similar to, the method for receiving the user's touch input or by using a separate recognition sheet. The keys 556, for example, may include physical buttons, optical keys, or a keypad. The ultrasonic input device 558 may detect acoustic waves with a microphone (for example, a microphone 588) in the electronic device 501 through an input means that generates ultrasonic signals to thereby identify data. The ultrasonic input device 558 may perform wireless recognition. According to an embodiment, the electronic device 501 may receive a user input from external devices (for example, computers or servers) that are connected with the same by using the communication module 520.

The display 560 (for example, the display 450) may include a panel 562, a hologram device 564, or a projector 566. The panel 562, for example, may be a liquid crystal display (LCD), an active-matrix organic light-emitting diode (AM-OLED), or the like. The panel 562, for example, may be implemented to be flexible, transparent, or wearable. The panel 562 may be configured with the touch panel 552 as a single module. The hologram device 564 may display 3D images in the air by using interference of light. The projector 566 may display images by projecting light onto a screen. The screen, for example, may be positioned inside or outside the electronic device 501. According to an embodiment, the display 560 may further include a control circuit for controlling the panel 562, the hologram device 564, or the projector 566.

The interface 570, for example, may include a high-definition multimedia interface (HDMI) 572, a universal serial bus (UBS) 574, an optical interface 576, or a D-sub-miniature (D-sub) 578. Additionally or alternatively, the interface 570, for example, may include a mobile high-definition link (MHL) interface, a secure digital (SD) card/multi-media card (MMC) interface, or an infrared data association (IrDA) standard interface.

The audio module 580 may convert a sound into an electric signal, and vice versa. For example, the audio module 580 may process sound information that is input or output through a speaker 582, a receiver 584, earphones 586, or a microphone 588.

The camera module 591 is a device for photographing still and moving images, and, according to an embodiment, it may include one or more image sensors (for example, a front sensor or a rear sensor), lenses (not shown), an image signal processor (ISP) (not shown), or a flash (not shown) (for example, LED or a xenon lamp).

The power control module 595 may manage power of the electronic device 501. Although it is not shown, the power management module 595, for example, may include a power management integrated circuit (PMIC), a charger integrated circuit (IC), or a battery or fuel gauge.

The PMIC, for example, may be mounted in integrated circuits or SoC semiconductors. The charging may be conducted by a wired type and a wireless type. The charger IC may charge a battery and may prevent inflow of an excessive voltage or current from the charger. According to an embodiment, the charger IC may include a charger IC for at least one of the wired charging type or the wireless charging type. The wireless charging type, for example, may encompass a magnetic resonance type, a magnetic induction type, or an electromagnetic wave type, and additional circuits for wireless charging, such as coil loops, resonance circuits, rectifiers, or the like, may be provided.

The battery gauge, for example, may measure the remaining power of the battery 596, a charging voltage and current, or temperature. The battery 596 may store or generate electric power, and may supply the stored or generated electric power to the electronic device 501. The battery 596, for example, may include a rechargeable battery or a solar battery.

The indicator 597 may display a specific state (for example, a booting state, a message state, or a charging state) of the whole or a part (for example, the AP 510) of the electronic device 501. The motor 598 may convert an electric signal to a mechanical vibration. Although it is not shown, the electronic device 501 may include a processing device (for example, a GPU) for supporting mobile TV. The processing device for supporting mobile TV may process media data according to the standards, such as, for example, digital multimedia broadcasting (DMB), digital video broadcasting (DVB), or media flow.

The "module" used in various embodiments of the present invention may refer to, for example, a "unit" including one of hardware, software, and firmware, or a combination of two or more of the hardware, software, and firmware. The "module" may be interchangeable with a term, such as a unit, a logic, a logical block, a component, or a circuit. The "module" may be a minimum unit of an integrated component element or a part thereof. The "module" may be a minimum unit for performing one or more functions or a part thereof. The "module" may be mechanically or electronically implemented. For example, the "module" according to various embodiments of the present invention may include at least one of an Application-Specific Integrated Circuit (ASIC) chip, a Field-Programmable Gate Arrays (FPGAs), and a programmable-logic device for performing operations which have been known or are to be developed hereafter.

According to various embodiments, at least a part of a device (for example, modules or functions thereof) or a method (for example, operations) according to the various embodiments of the present invention may be embodied by, for example, a command stored in a computer readable storage medium in a form of a programming module. When the command is executed by one or more processors, the one or more processors may perform a function corresponding to the command. The computer-readable storage medium may be, for example, the memory 260. At least some of the programming modules may be implemented (for example, executed) by, for example, the processor. At least a part of the programming module may, for example, include a module, a program, a routine, a set of instructions, or a process for performing at least one function.

The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory. In addition, the program instructions may include high class language codes, which can be executed in a computer by using an interpreter, as well as machine codes made by a compiler. The aforementioned hardware device may be configured to operate as one or more software modules in order to perform the operation of the present invention, and vice versa.

Embodiments of the present invention provided in the present specifications and drawings are merely certain examples to readily describe the technology associated with embodiments of the present invention and to help understanding of the embodiments of the present invention, but may not limit the scope of the embodiments of the present invention. Therefore, in addition to the embodiments disclosed herein, the scope of the various embodiments of the present invention should be construed to include all modifications or modified forms drawn based on the technical idea of the various embodiments of the present invention.

It will be appreciated that the exemplary embodiments of the present invention may be implemented in a form of hardware, software, a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the software may be stored in a machine (for example, a computer)-readable storage medium. It is appreciated that the storage unit included in the electronic device is one example of the machine-readable storage media suitable for storing a program or programs including commands for implementing various embodiments of the present invention. Accordingly, the present invention includes a program that includes a code for implementing an apparatus or a method defined in any claim in the present specification and a machine-readable storage medium that stores such a program. Further, the program may be electronically transferred by a predetermined medium such as a communication signal transferred through a wired or wireless connection, and the present invention appropriately includes equivalents of the program.

The invention claimed is:

1. A method of searching for an access point of a local area network in an electronic device, the method comprising:
   determining a moving level of the electronic device;
   searching for an access point of the local area network according to a result of the determination on the moving level of the electronic device;
   measuring an amount of change in signal strength of the access point; and
   determining whether or not to access the access point according to the moving level of the electronic device and the amount of the change in the signal strength of the access point,
   wherein the determining of the moving level of the electronic device comprises:
   identifying the moving level of the electronic device by using position information of the electronic device, which is measured through at least one of a sensor or a GPS module in the electronic device, a Doppler frequency change of a serving cell of the electronic device, a change in a strength of a signal that is received from one or more nearby cells of the electronic device, a change in a strength of a signal that is received from a base station of a mobile communication network, or a change in the number of nearby cells of the electronic device; and comparing the identified moving level with a first reference value to then determine that the moving level of the electronic device is high if the identified moving level is equal to, or more than, the first reference value and to then determine that the moving level of the electronic device is low if the identified moving level is less than the first reference value.

2. The method according to claim 1, wherein the searching for the access point of the local area network comprises:
identifying a change in the moving level of the electronic device while being connected to, or disconnected from, the access point; and
determining whether or not to search for the access point of the local area network according to the change in the moving level of the electronic device.

3. The method according to claim 1, wherein the identifying of the moving level of the electronic device by using the change in the strength of the signal that is received from one or more nearby cells of the electronic device comprises:
calculating a mean value of amounts of changes in strength of a reception signal that is received from a nearby cell of the electronic device for a specified period of time; and
identifying the moving level of the electronic device by using the calculated mean value.

4. The method according to claim 3, further comprising determining a signal strength change of the access point by comparing the amount of the change in the signal strength of the access point and a second reference value, and if the number of nearby cells of the electronic device is less than a specified number of nearby cells, identifying the moving level of the electronic device by using the strength of the reception signal that is received from the nearby cell of the electronic device and the signal strength change of the access point.

5. The method according to claim 1, wherein the determining whether or not to access the access point comprises:
identifying the access point that has the minimum signal strength change among discovered access points according to the amount of the change in the signal strength;
determining signal strength change of the identified access point to be high if the amount of the change in the signal strength of the identified access point is equal to, or more than, a second reference value, and determining signal strength change of the identified access point to be low if the amount of the change in the signal strength of the identified access point is less than the second reference value; and
determining whether or not to access the identified access point according to the moving level of the electronic device and the determined signal strength change of the identified access point.

6. The method according to claim 5, wherein the identifying of the access point that has the minimum signal strength change comprises:
calculating a mean value of amounts of changes in a strength of a reception signal that is received from the access point; and
determining an access point that has the minimum calculated mean value to be the access point having the minimum signal strength change.

7. An electronic device comprising:
a local area communication module that searches for one or more access points of a local area network and performs wireless local area communication;
a controller that determines a moving level of the electronic device, searches for an access point of the local area communication module according to a result of the determination on the moving level, measures an amount of change in signal strength of the access point, and determines whether or not to access the access point according to the moving level of the electronic device and the amount of the change in the signal strength of the access point; and
a mobile communication module that performs mobile communication,
wherein the controller: identifies a Doppler frequency change of a serving cell of the electronic device, a change in a strength of a signal that is received from one or more nearby cells of the electronic device, a change in a strength of a signal that is received from a base station of the mobile communication network, or a change in the number of nearby cells of the electronic device by using a signal that is received through the mobile communication module; identifies the moving level of the electronic device by using the identified change; and compares the identified moving level with a first reference value to then determine that the moving level of the electronic device is high if the identified moving level is equal to, or more than, the first reference value and to then determine that the moving level of the electronic device is low if the identified moving level is less than the first reference value.

8. The electronic device of claim 7, wherein the controller: identifies a change in the moving level of the electronic device while being connected to, or disconnected from, the access point; and determines whether or not to search for the access point according to the change in the moving level of the electronic device.

9. The electronic device of claim 8, further comprising a mobile communication module that performs mobile communication, wherein the controller: by using a signal that is received through the mobile communication module, identifies the moving level of the electronic device by using the change in the strength of the signal that is received from the one or more nearby cells of the electronic device and the amount of the change in signal strength of the access point if the number of nearby cells of the electronic device is less than a specified number of nearby cells; and compares the identified moving level with a first reference value to then determine that the moving level of the electronic device is high if the identified moving level is equal to, or more than, the first reference value and to then determine that the moving level of the electronic device is low if the identified moving level is less than the first reference value.

10. The electronic device of claim 8, further comprising a GPS module or a sensor that senses position of the electronic device, wherein the controller: identifies the moving level of the electronic device by using the position of the electronic device that is sensed through at least one of the GPS module or the sensor; and compares the identified moving level with a first reference value to then determine that the moving level of the electronic device is high if the identified moving level is equal to, or more than, the first reference value and to then determine that the moving level of the electronic device is low if the identified moving level is less than the first reference value.

11. The electronic device of claim 10, wherein the controller: identifies the access point that has the minimum signal strength change among discovered access points according to the amount of the change in the signal strength; determines signal strength change of the identified access point to be high if the amount of the change in the signal strength is equal to, or more than, a second reference value; determines signal strength change of the identified access point to be low if the amount of the change in the signal strength is less than the second reference value; and makes a control to access, or to not access, the identified access point through the local area communication module according to the moving level of the electronic device and the determined signal strength change of the identified access point.

12. The electronic device of claim 11, wherein the controller makes a control to access the identified access point through the local area communication module if the moving level of the electronic device is determined to be high or low, and if the signal strength change of the identified access point is determined to be low.

13. The electronic device of claim 11, wherein the controller makes a control to not access the identified access point through the local area communication module if the moving level of the electronic device is determined to be high, and if the signal strength change of the identified access point is determined to be high.

14. The electronic device of claim 11, wherein the controller makes a control to not access the identified access point through the local area communication module and controls the local area communication module to re-search for one or more accessible access points according to specified conditions if the moving level of the electronic device is determined to be low, and if the signal strength change of the identified access point is determined to be high.

15. The electronic device of claim 11, wherein the controller determines to search for the access point through the local area communication module at least once according to specified conditions if it is identified that the moving level of the electronic device is changed from low to high, or if it is identified that the moving level of the electronic device is changed from high to low while being connected to the identified access point.

16. The electronic device of claim 11, wherein the controller determines to search for the access point through the local area communication module at least once according to specified conditions if it is identified that the moving level of the electronic device is changed from low to low while being disconnected from the identified access point.

17. The electronic device of claim 11, wherein the controller determines to search for the access point through the local area communication module at least once according to specified conditions if it is identified that the moving level of the electronic device is changed from low to high while being disconnected from the identified access point.

18. The electronic device of claim 11, wherein the controller determines to not search for the access point through the local area communication module if it is identified that the moving level of the electronic device is changed from high to high while being disconnected from the identified access point.

* * * * *